United States Patent [19]
Bostick et al.

[11] 3,821,643
[45] June 28, 1974

[54] BLOOD COAGULATION TIMER

[75] Inventors: William Derry Bostick; Peter William Carr, both of Athens, Ga.

[73] Assignee: Research Corporation, New York, N.Y.

[22] Filed: May 29, 1973

[21] Appl. No.: 364,278

[52] U.S. Cl. ............ 324/65 R, 23/230 B, 73/15 A, 73/64.1, 128/2 G
[51] Int. Cl. ............................................ G01r 27/02
[58] Field of Search ............ 324/65 R, 30 B, 65 D; 128/2 G, 2.1 R, 2.1 E, 2 E; 23/230 B; 73/15 A, 64.1, 322 AR

[56] References Cited
UNITED STATES PATENTS

| | | |
|---|---|---|
| 3,267,362 | 8/1966 | Page .................................. 128/2 G |
| 3,268,804 | 8/1966 | Young .................................. 128/2 G |
| 3,553,481 | 1/1971 | Hasenbeck ..................... 324/65 R X |
| 3,699,437 | 10/1972 | Ur ...................................... 324/65 R |

*Primary Examiner*—Stanley T. Krawczewicz
*Attorney, Agent, or Firm*—Cameron, Kerkham, Sutton, Stowell & Stowell

[57] ABSTRACT

The clotting time of blood is determined at the instant of the initiation of clotting by detecting the sharp change in electrical resistance of a resistive circuit component having a large negative or positive temperature coefficient of resistance, immersed in the blood. The clotting time may be indicated visually, or audibly, or a time-temperature reading may be continuously recorded on a strip chart or the like or a combination of such indicators may be used.

4 Claims, 4 Drawing Figures

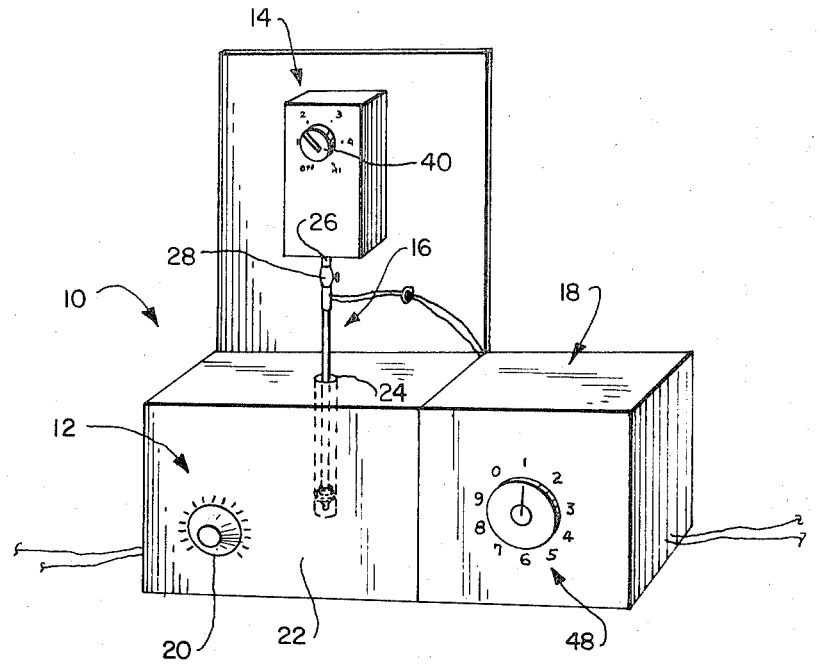
FIG. 1
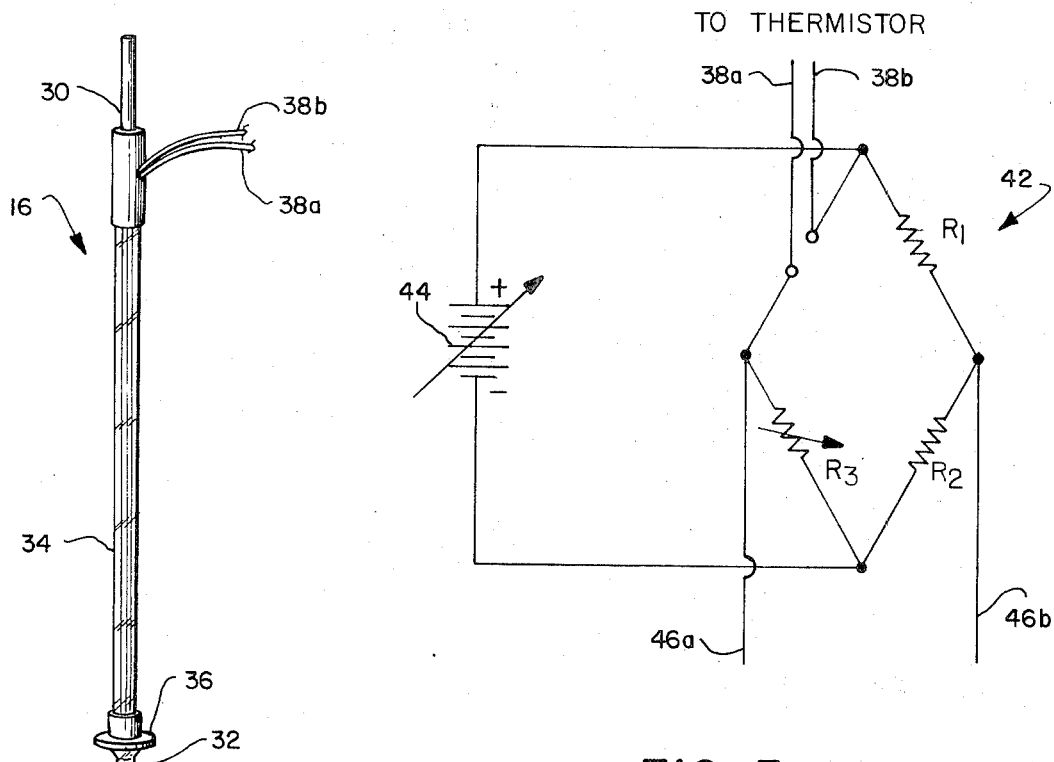
FIG. 2
FIG. 3

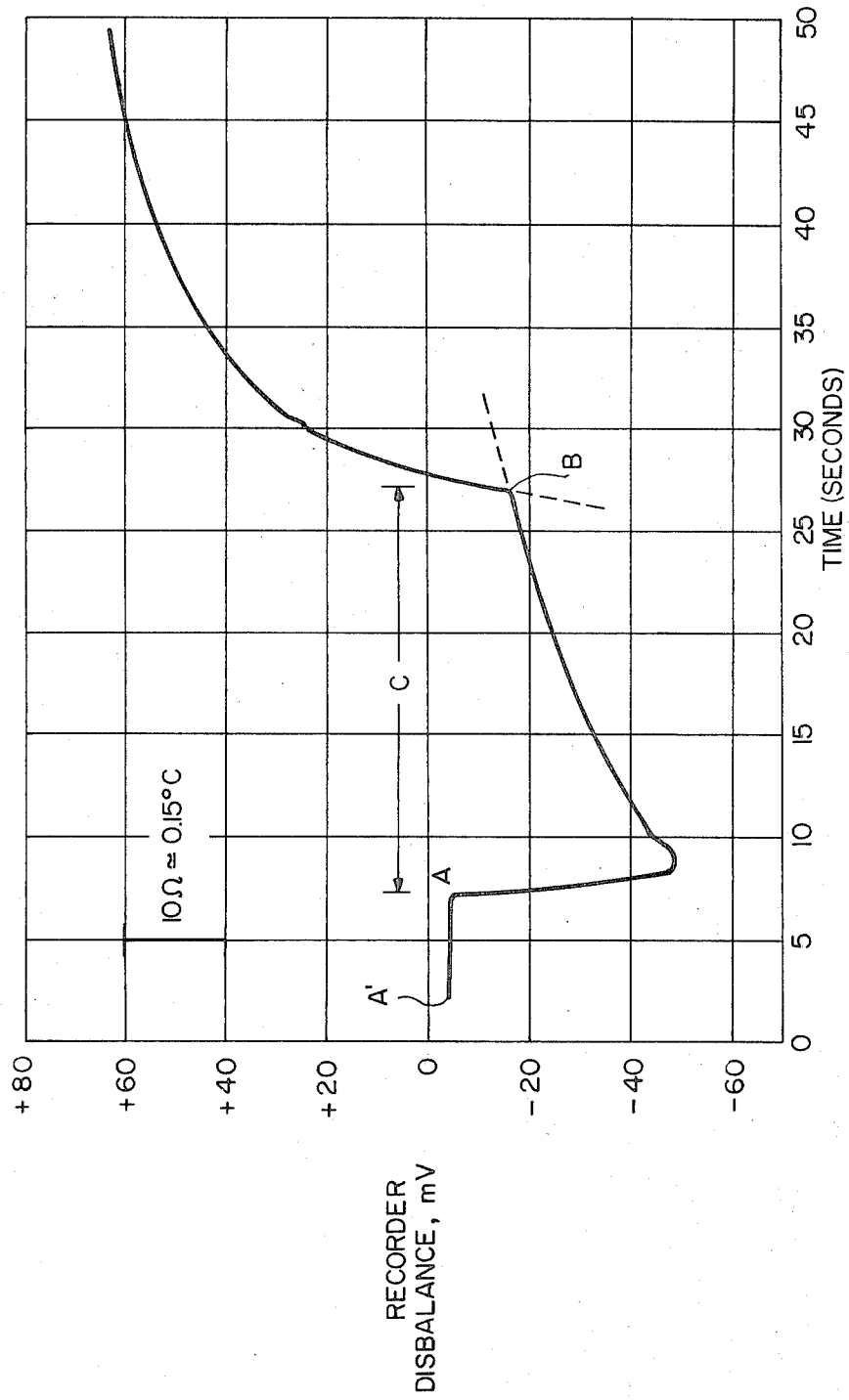

BLOOD COAGULATION TIMER

The invention described herein was made in the course of work under a grant or award from the Department of Health, Education and Welfare.

BACKGROUND OF THE INVENTION

Blood clotting time or the time at which fibrinogen, a protein found in plasma, forms a detectable clot or web is important to hematology in that clotting time is the measured variable in many clinical tests such as:
1. whole blood clotting time
2. clotting time of recalcified plasma
3. contact activation test
4. (a) thrombin generation test (TGT)
   (b) Hicks-Pitney modification of TGT
5. thrombin time for fibrinogen determination
6. thromboplastin generation test
7. quick one-stage assay for prothrombin
8. prothrombin time test (Link-Shapiro modification)
9. Owren prothrombin-proconvertin test
10. Ware-Stragnell modification of prothrombin-proconvertin test
11. prothrombin consumption test
12. two-stage method for measurement of prothrombin
13. screening tests for clotting-factor deficiencies
14. partial thromboplastin time
15. activated partial thromboplastin time
16. differential partial thromboplastin time

THE PRIOR ART

Notwithstanding the importance of such tests (a survey states that over 500,000,000 hematological tests per year were run in 1969) and notwithstanding that a number of companies have developed and commercialized various instruments most do not conform to the requirements or have the characteristics of an ideal recording instrument for measurement of blood coagulation which has been defined as one that will: continuously measure the clotting process, provide an immediate recorded graph as the clotting process goes on . . . thermostatically controlled with short warm-up period, be very sensitive and be equally suitable for a variety of coagulation studies. Addition of reaction initiators such as CaCl$_2$ should automatically start the measurement of time. Multiple simultaneous determinations should be possible and the clotting specimen should not be subjected to any stress. The machine should require small amounts of blood, be compact and easy to handle. With such an instrument clotting tests could be more readily standardized, the subjective human error markedly reduced, and considerable time saved. In addition, the ideal instrument should provide acquisition of additional information not obtainable by other methods and production of permanent records.

THE PRESENT INVENTION

It is a primary object of the present invention to provide an instrument which will meet the most significant of the hereinbefore listed characteristics of an ideal blood clot timer.

It is another object to provide such a device which is relatively simple in construction; reliable in use and relatively simple to operate.

Other objects and advantages are provided by a blood clot indicating device comprising a blood sample holder, means for maintaining the holder and a blood sample containable therein at a constant temperature, a thermistor, means mounting said thermistor for oscillatory motion in said sample holder, and circuit means for determining an abrupt change in the resistance of siad thermistor.

The invention will be more fully described in reference to the accompanying drawing wherein:

FIG. 1 is a perspective view of a blood clotting time measuring device constructed in accordance with the teaching of this invention;

FIG. 2 is an enlarged perspective view of a portion of the device shown in FIG. 1;

FIG. 3 is an electrical diagram of a portion of the circuit for the device of the invention; and FIG. 4 is a typical curve-plot of the output voltage versus time during a coagulation time determination.

Referring now to FIGS. 1, 2 and 3, 10 generally denotes one embodiment of our improved blood clotting time determination device.

The device 10 in general includes, a constant temperature bath or block 12; a variable agitator mechanism 14; a combined blood agitator and thermistor support 16 and timer and control chassis 18.

The constant temperature means 12 includes control means 20 whereby a water bath or metal block within the housing 22 may be maintained at a relatively constant temperature of, for example, about 37° C.

A sample holder 24 is received within the bath with the opening in the sample holder being axially aligned below the vibrator output shaft 26.

The chuck or coupling 28 mounts the mixing or agitator rod 30 to the vibrator. The extended end of the rod 30 mounts a conventional commercial semiconductor bead 32 having a large temperature coefficient of resistance, which may be either negative or positive, known in the art as a thermistor.

The thermistor is mounted in a glass tube and a circular plastic or glass disc 36 is fitted over the thermistor rod leaving the glass or otherwise enclosed temperature sensitive tip exposed. Internally of the glass tube 34 are mounted the pair of electrical conductors 38a and 38b which are connected to the thermistor. The mixer or vibrator 14 may be of commercial design and include a control knob 40 so that the vibratory amplitude of the device may be adjusted so that mixing of the blood sample is neither too violent or too sluggish.

As shown in FIG. 3, the external ends of leads 38a and 38b are connected to form one leg of a Wheatstone bridge 42. Other legs of the bridge include resistances R$_1$ and R$_2$ of about 2KΩ and the remaining leg has connected thereto a variable resistor such as resistance decade box R$_3$. The bridge is powered by several 1.5 volt cells 44 wired in series, which power supply may be variable as shown. The output leads 46a and 46b may be connected to a commercial recorder, such as a Heath recorder 100 mv full scale, or to a simple voltmeter or alarm.

Further the control chassis 18 may include an additional circuit for signal conditioning and a visual or printing second timer such as shown at 48.

THEORY OF OPERATION

The internal temperature of the thermistor (T$_T$) is the sum of two factors: the temperature of the thermistor's environment, i.e., the solution temperature (T$_s$) and the temperature difference due to "self-heating" (ΔT) thusly:

$$T_T = T_s + \Delta T$$

The term, $\Delta T$, is the ratio of two factors, the power ($P$) dissipated by ohmic heating and dissipation constant ($\delta$) $\Delta T = i_T^2 R_T/\delta$ which is defined in milliwatts /°C. $R_T$ is the resistance of the thermistor at $T_T$ and $i_T$ is the current flowing in the thermistor. The dissipation constant depends upon several terms including the thermal conductance of the surrounding medium ($\lambda$) the velocity $f(v)$ of the solution in a thin layer around the thermistor, a proportionality constant ($a$) which depends upon geometry, and a medium independent term inherent to the thermistor ($\delta_o$).

$$\delta = \delta_o + a\lambda f(v)$$

Combining these equations we have:

$$T_T \cong T_s + i_T^2 R_T/\delta_o + a\lambda f(v)$$

When a clot forms the term $a\lambda f(v)$ undergoes a very rapid decrease as sketched in FIG. 4. The change is due to some combination of a drastic decrease in $\lambda$ or in the solution velocity. The change in $\delta$ is reflected in a rise in $T_T$. This rise is registered by the Wheatstone bridge as follows:

$$R_T = R_o [1 + \beta (T_T - T_o)]$$

$$e_o = (1/4)(E_B \Delta R/R_o)$$

$$e_o = (-1/4) E_B \beta (T_T - T_o)$$

The terms $\beta$, $E_B$ and $R_o$ are the temperature coefficient of resistance, the applied bridge voltage and the thermistors resistance at $T_o$ respectively. $\Delta R$ is the change in the thermistor's resistance. When $T_T$ undergoes a rapid change due to the change in $\delta$, then $\Delta R$ and $e_o$, the bridge output potential, change in proportion to $T_T$.

Now referring to FIG. 4 of the drawing illustrating a typical voltage-time plot of a device constructed as disclosed herein, point A designates the initiation of clotting reaction and the starting of the timing device by the addition of a thromboplastin to the blood sample; point B is the extrapolated end point; C is the linear distance (time) between points A and B corresponding to the "clotting time." The device has a constant output voltage between points A' and A then the voltage drops upon the addition of, for example, 0.1 ml of 0.1 M $CaCl_2$ to 1.0 ml of plasma thereby indicating the start of the timing process. As the constant temperature bath brings the temperature up toward the control point A we have a gradual increase in voltage between points A and B. At point B the resistance change of the thermistor registers as the sharp change in slope as the clot formation affects the thermal dissipation of heat about the thermistor tip, thus providing a very sensitive, immediate record of clot formation. At point B the timer is read and/or automatically stopped.

EXAMPLES

A total volume of ~1/cc of sample plasma and modified commercial thromboplastin (e.g., decalcified Warner-Chilcott Simplastin) is placed in a small glass test tube (24). The tube is lowered into the thermostated water bath which is controlled to $\pm 0.05°$ C. A ~2K$\Omega$ thermistor mounted in the chuck of a vibratory or oscillatory mixer 14 is immersed in the sample. The thermistor is electrically connected to the Wheatstone bridge (42) whose disbalance may be monitored on a strip chart recorder, not shown.

The sample tube is equilibrated with the bath while a bridge output baseline is established. A small aliquot (100 micro liters) of 0.4M calcium chloride is injected from a glass syringe, and the timer is simultaneously started. This is point A in FIG. 4 and the sharp voltage decrease is a result of temperature mismatch and reaction of the added calcium chloride solution with the anticoagulant used in sample collection. At the moment when the sample clots the slope of the voltage-time curve changes drastically as at point B, FIG. 4.

Table I illustrates the reproducibility of the tests:

| Run No. | Endpoint Time, sec. | Deviation from mean, sec. |
|---|---|---|
| 1. | 15.1 | 0.0 |
| 2. | 15.8 | +0.7 |
| 3. | 15.1 | 0.0 |
| 4. | 15.0 | −0.1 |
| 5. | 14.0 | −1.1 |
| 6. | 14.9 | −0.2 |
| 7. | 16.0 | +0.9 |

From the foregoing description it will be seen that the instrument of the invention fully accomplishes the aims and objects herein set forth and others. It will also be recognized by those skilled in the art that various modifications may be made in the form of the illustrated timer without departing from the scope of the present invention, for example, the timer may be provided with a series of openings to receive a number of blood samples and the clot-time measurements may be made sequentially with automatic introduction of the proper amounts of thromboplastin solution.

We claim:

1. A blood clotting indicating device comprising a blood sample holder, means for maintaining the holder and a blood sample containable therein at a constant temperature, a resistive circuit component having a large temperature coefficient of resistance, means mounting said resistive circuit component for movement in said sample holder, and circuit means for determining an abrupt change in the resistance of said resistive circuit component.

2. The invention defined in claim 1 wherein the resistive circuit component comprises a thermistor.

3. The invention defined in claim 1 wherein said resistive circuit component has a large negative temperature coefficient of resistance.

4. The invention defined in claim 1 wherein said resistive circuit component has a large positive temperature coefficient of resistance.

* * * * *